United States Patent

Lender et al.

[15] 3,665,394

[45] May 23, 1972

[54] DATA ERROR DETECTOR FOR DETERMINING THE ERROR RATE PRIOR TO EQUALIZATION

[72] Inventors: Adam Lender, Palo Alto; Berton E. Dotter, Jr., Belmont, both of Calif.

[73] Assignee: GTE Automatic Electric Laboratories Incorporated, Northlake, Ill.

[22] Filed: Sept. 23, 1970

[21] Appl. No.: 74,786

[52] U.S. Cl. ........................................340/146.1AX, 325/41

[51] Int. Cl. ........................................................G08c 25/00

[58] Field of Search .....................340/146.1; 325/41, 42, 38, 325/65; 178/69; 333/18

[56] References Cited

UNITED STATES PATENTS 3,573,623 4/1971 Bannon...................................325/42

OTHER PUBLICATIONS

Sellers, Hsiao, and Bearnson, Error Detecting Logic for Digital Computers, McGraw-Hill Co., 1968, pp. 221–225.

*Primary Examiner*—Charles E. Atkinson

*Attorney*—Kurt Mullerheim, Leonard R. Cool and Russell A. Cannon

[57] ABSTRACT

A transversal filter or equalizer will reduce to zero, errors that result from amplitude or phase distortion in the transmission facility where such distortion is within the equalization range of the transversal filter. The equalized output is used as a reference and is connected to one input of a comparator. The unequalized data signal is connected to another input of the comparator and the comparator produces an error signal at its output whenever an error occurs. The error signal actuates an indicator such as an impulse counter thereby giving bit-by-bit error indications.

9 Claims, 3 Drawing Figures

Patented May 23, 1972 3,665,394

2 Sheets-Sheet 1

INVENTORS
BERTON E. DOTTER, JR.
ADAM LENDER

BY

AGENT

DATA ERROR DETECTOR FOR DETERMINING THE ERROR RATE PRIOR TO EQUALIZATION

BACKGROUND OF THE INVENTION

1. Field of the Invention

This invention relates to error detection in data transmission systems and more particularly to error detection in data transmission systems which include a transversal filter at the receiver to correct for amplitude and phase distortion of the transmission medium.

2. Description of the Prior Art

The problem of transmission of data signals over noisy and distorted communications channels in a reliable manner is a significant one. Many techniques have been employed to achieve this reliable transmission objective. Since one primary concern is the accuracy of the data recovered at the receiver, considerable effort has been expended in the development ways of detecting errors introduced in the communications channel. The development of error correcting codes and their use in data systems is one well-known way in which reliability of transmission has been improved. Other systems employ parity bits to permit detection of code groups containing errors, and in conjunction with such detection a retransmission request may be initiated. These techniques are also well-known in the art. While improving the reliability of the recovery of the transmitted data such techniques tend to adversely affect the through-put rate, i.e., the actual rate of transmission of information.

For the higher data rates, reliable transmission over normal communications channels requires the equalization of amplitude and phase distortion of the channel. Equalization of phase distortion is most readily accomplished in the time domain and transversal filters having manual, automatic or adaptive adjustments have been developed for this purpose. Such filters, when properly adjusted for the communications channel, will not only provide the necessary equalization for the phase characteristics of the channel but will also equalize for the variations in attenuation. Further, the transversal filter will minimize the effects of random noise in the mean square sense provided the equalizer algorithm minimizes mean square error. Thus, a nearly error-free recovery of the data information is provided.

Impulse noise which will mutilate a pulse or a series of pulses will not normally be corrected by the filter. Further, phase jitter may be sufficiently severe as to cause errors in the recovery of the data signal. The noise and jitter problems are most often virtually eliminated by selection of the circuit where a dedicated line is reserved for the transmission of data. In such applications, manually adjustable transversal filters may be used since the filter can be adjusted to the nominal line characteristics. Final adjustment can be accomplished prior to the transmission of the data stream. If data streams of long time duration are used, it is possible that the equalizer will not continue to compensate for the variations in line characteristics that might occur. It is therefore important to have an indication of the error rate so that readjustment may be made before the error rate becomes too great.

While data circuits employing dedicated circuits are in widespread use, the cost for the use of such circuits has created a demand for higher speed data transmission systems, and for the ability to use these higher speed data systems over the switched telephone network. Use of the switched network permits a reduction in circuit cost of the transmission medium and increases the flexibility of the data network. Unfortunately, not all of the channels in the switched network will permit high speed data transmission. Either phase distortion, phase jitter or impulse noise or any combination of these deteriorating factors may be present in sufficient magnitude to cause an intolerable error rate. This may be true despite the use of the most advanced adaptive transversal filter techniques. It is highly desirable therefore to know what the error rate is prior to equalization in order to determine if the circuit may be used for data transmission. Further, it is often desirable to know what the error rate prior to equalization is on a continuing basis since it is possible that the error rate prior to equalization might exceed the capability of the transversal equalizer.

The equalization range of a transversal equalizer depends upon whether or not manual or adaptive equalization techniques are used and whether or not the more modern techniques of digital adaptive equalization are employed. For the manual equalizer, error rates of approximately 5 percent could be corrected for by the equalizer whereas with the digital adaptive techniques error rates as high as 25 percent are within the equalization capability of the equalizer. Whenever the errors in the unequalized signal exceed the equalization range of the equalizer a comparator would receive inputs from the unequalized input and from a now unequalized output from the transversal equalizer, and these two signals would be psuedo-random in nature. The error rate that would be indicated would therefore approach 50 percent rather than a 100 percent rate error rate.

One technique whereby the error rate before equalization and the error rate after equalization may be measured for an adaptive equalizer is described in a paper entitled "Decision-Directed Digital Adaptive Equalization Technique for High-Speed Data Transmission" by one of the applicants, Adam Lender, presented at the IEEE International Communication Conference held in San Francisco June 8, 9 and 10, 1970, and published in the Conference Record at Vol. I, pages 4–18 to pages 4–29. In particular, the error determining technique is shown schematically in FIG. 5 at page 4–26 and is discussed under the subheading "The Experimental Performance" which begins at page 4–20. While the error rates prior to equalization may be determined, it is apparent that the binary data input to the data transmitter must be made available to the comparator in order to determine the error rate before equalization and the error rate after equalization for the adaptive equalizer. While this is practical in a laboratory it is relatively impractical in a working system. One could conceivably consider transmitting the binary data input over a separate communication channel. However, such a technique would not only be costly but would not insure that the binary data received from the transmitting terminal was error free since it must also be transmitted over a communication facility that could introduce errors into the data stream. This laboratory technique has the advantage that it does not reduce the data through-put rate and is relatively simple but suffers from the fact that it cannot be used in a working system.

It was discovered by the inventors that that the error rate prior to equalization could be closely approximated by using the equalized output of the transversal equalizer as the reference rather than the original binary data which is applied to the transmitter input. By so doing the desired advantages of simplicity, economy and maintenance of the through-put rate are obtained and the error rate prior to equalization is obtained on information at the receiving end of the system.

SUMMARY OF THE INVENTION

It is accordingly an object of this invention to provide a technique of error detection that is relatively simple and inexpensive and does not require a reduction in the data through-put rate.

It is a further object of this invention to provide a technique of error detection that relies upon information obtained or derived at the receiving end of the system.

It is another object of the present invention to determine the initial error rate prior to equalization of the received data signal. Thus the condition of the transmission facility is known at the beginning of transmission of the data stream, and if the error rate is too high a separate facility may be selected.

It is another object of the invention to determine the error rate prior to equalization on a continuing basis. In the event of a significant change in the transmission characteristics of the facility it is desirable to know what effect this has on the error rate during transmission of the data stream.

These and other objects of the present invention are illustrated in specific embodiments which include portions of the equalizers as well as the error detecting and error indicating apparatus at the receiver. The transversal filter output is used as a reference and this reference is applied to an input of a comparator. So long as the characteristics of the system are within the equalization range of the particular equalizer, the equalized output should be substantially error-free. Fortuitous disturbances will cause occasional errors, however, these will normally be insignificant. The magnitude of the unequalized data signal is obtained and is applied tp another input of the comparator. The comparator detects as errors any difference between the input signals, and where such differences occur the comparator provides an output error signal. This signal is applied to an error indicator which may be set to ring an alarm when the number of errors exceeds a predetermined number. Should the equalization range be exceeded either because of the inherently poor quality of the transmission medium or because of some change in the characteristics of the transmission medium, the equalizer may not correct for all the errors introduced by the transmission medium. In this case the equalizer output will not provide a correct reference and it is equally likely that the output will be the same as, or different than, the unequalized input. Under this condition an error rate which exceeds the equalization range of the equalizer will normally be indicated.

DETAILED DESCRIPTION

Figure 1:
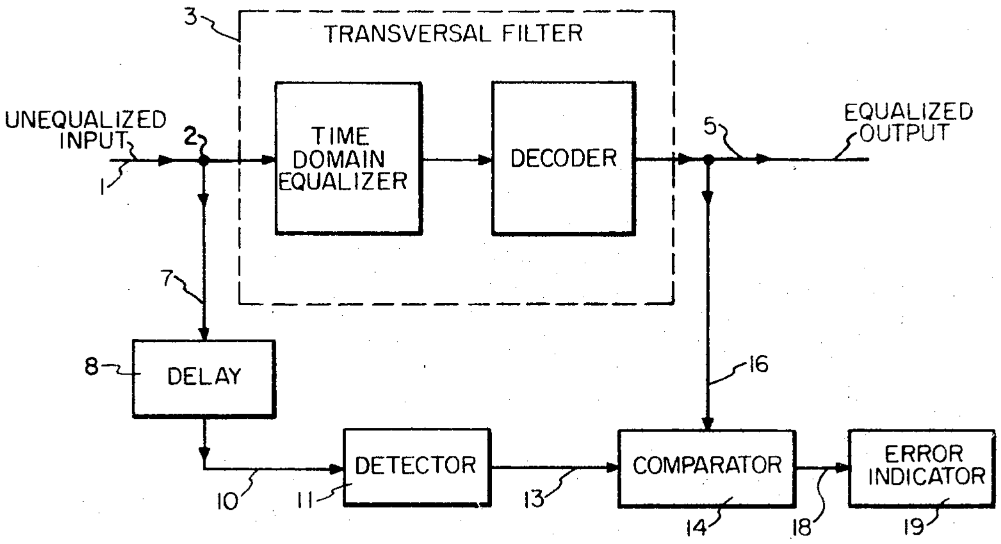
FIG. 1 is a block diagram of an error detection system according to the invention in which the unequalized signal portion is taken directly from the unequalized input lead of the receiving path.

Referring now to FIG. 1, a data signal in binary, multilevel or correlative form enters as an unequalized input on line 1 of the receiving path and is applied to the transversal filter 3 via junction 2 and to the delay 8 via lead 7. In the transversal filter 3 the unequalized data signal is corrected to compensate for the phase and amplitude distortion characteristics of the transmission channel and then is decoded in the decoder to provide a binary output on lead 5 which is an equalized binary output signal. The unequalized signal to be compared with the equalized output signal enters detector 11 via lead 10 from delay 8. Delay 8 is required so that the signals will arrive at comparator 14 in the proper timing sequence. This delay is always known and fixed. It matches the delay of the equalizer and decoder at the receiving end. Detector 11 must change the unequalized input signal into its binary equivalent for application on a digit basis via lead 13 to comparator 14. In the comparator the two signals, that is the one equalized and the one not equalized, are compared to determine if they both are binary 1's or binary 0's and where the two signals are the same there is no output on lead 18 and so no indication of error in error indicator 19. Should an error occur, comparator 14 would supply an error signal indication on lead 18 which would cause error indicator 19 to indicate that an error had occurred. The result of the comparison of the unequalized and the equalized binary signal is a bit-by-bit error rate indication before equalization or an indication of the initial error rate provided that the system is equalized by the transversal filter.

Figure 2:
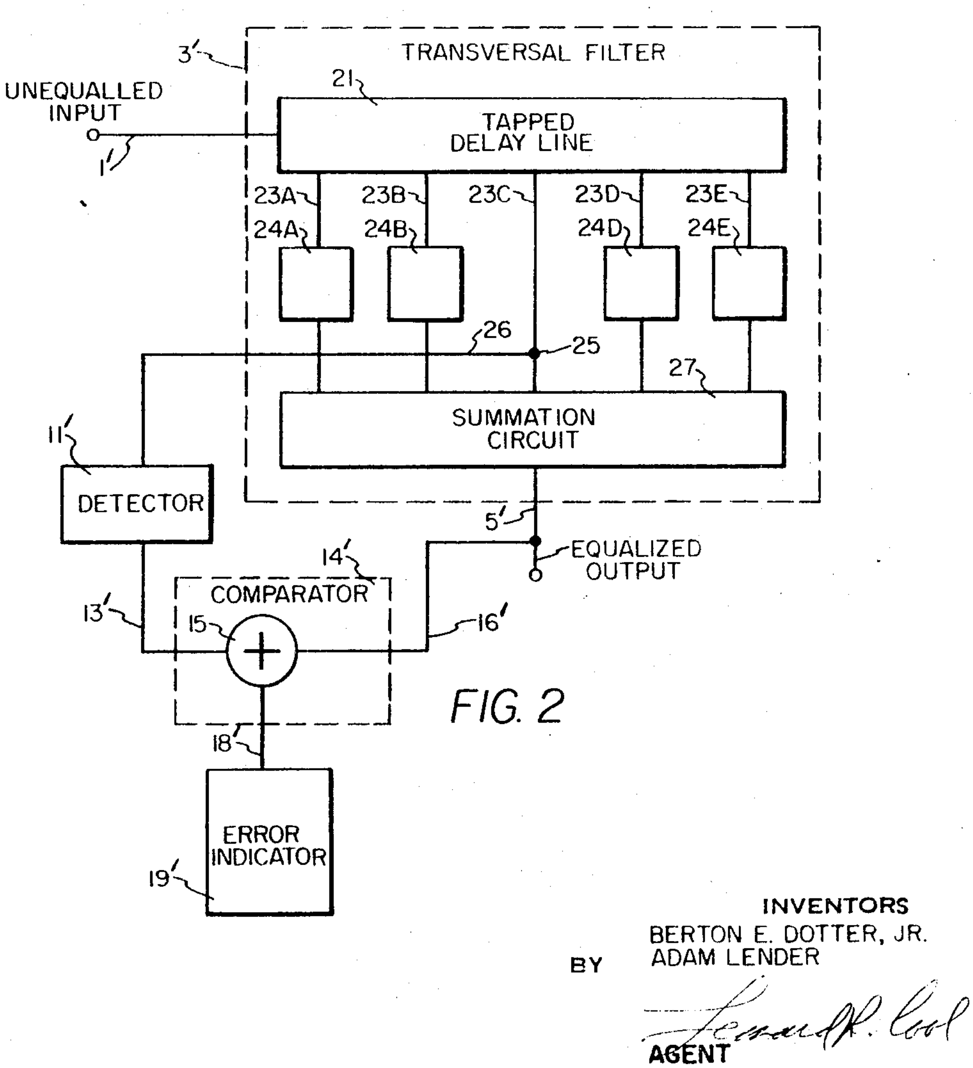
FIG. 2 is a block diagram of an embodiment of an error detection system according to the invention in which the unequalized signal portion is taken from the main tap of an analog filter employing a tapped delay line in the equalization process.

In the embodiment of the invention shown in FIG. 2 those parts which are similar to the ones of FIG. 1 are given the same base number, but a prime is included to distinguish these items in FIG. 2 from the ones discussed with FIG. 1. For example, the unequalized input is applied in FIG. 2 to lead 1'. The transversal filter 3' is made up of a tapped delay line 21 having five taps which are designated with the base number 23 and an additional letter to identify the separate taps. For example, the first tap is 23A, the main tap is 23C, and the final tap is 23E. In all but the main tap it is well known that attenuators are used to adjust the output for these taps so that the inputs to the summation circuit will add properly to correct for phase and amplitude distortion of the signal caused by the communications channel. The summation circuit 27 of the instant filter has an output 5' which under normal circumstances would be equalized by the filter. In this embodiment the unequalized data signal is taken from the main tap of the transversal filter at connection point 25 along lead 26 to detector 11'. While the unequalized data signal could just as well be taken from the input to the transversal filter, this would require the use of a separate time delay network such as illustrated at 8 in FIG. 1. By taking the unequalized data signal from the main tap of delay line 21, a separate time delay network is not necessary because the desired time delay is introduced by the delay line. The detector must convert the signal to binary and slice it to provide a binary output on lead 13' which supplies the unequalized signal input in comparator 14'. Such detectors are well known in the art for changing multilevel and correlative line signals into their binary equivalents. In this example the comparator can be an EXclusive-OR gate which is shown at 15 within comparator 14'. The second input to comparator 14' is from the equalized output on lead 5' which is applied via lead 16' to comparator 14'. The Truth Table for an EXclusive-OR gate shows that an output would occur whenever the two input signals are unlike, and no output will occur when the input signals are both the same. The error indicator 19' is connected to the output of EXclusive-OR gate 15 by means of lead 18' and this error indicator will give a bit-by-bit error indication whenever an error signal occurs.

Figure 3:
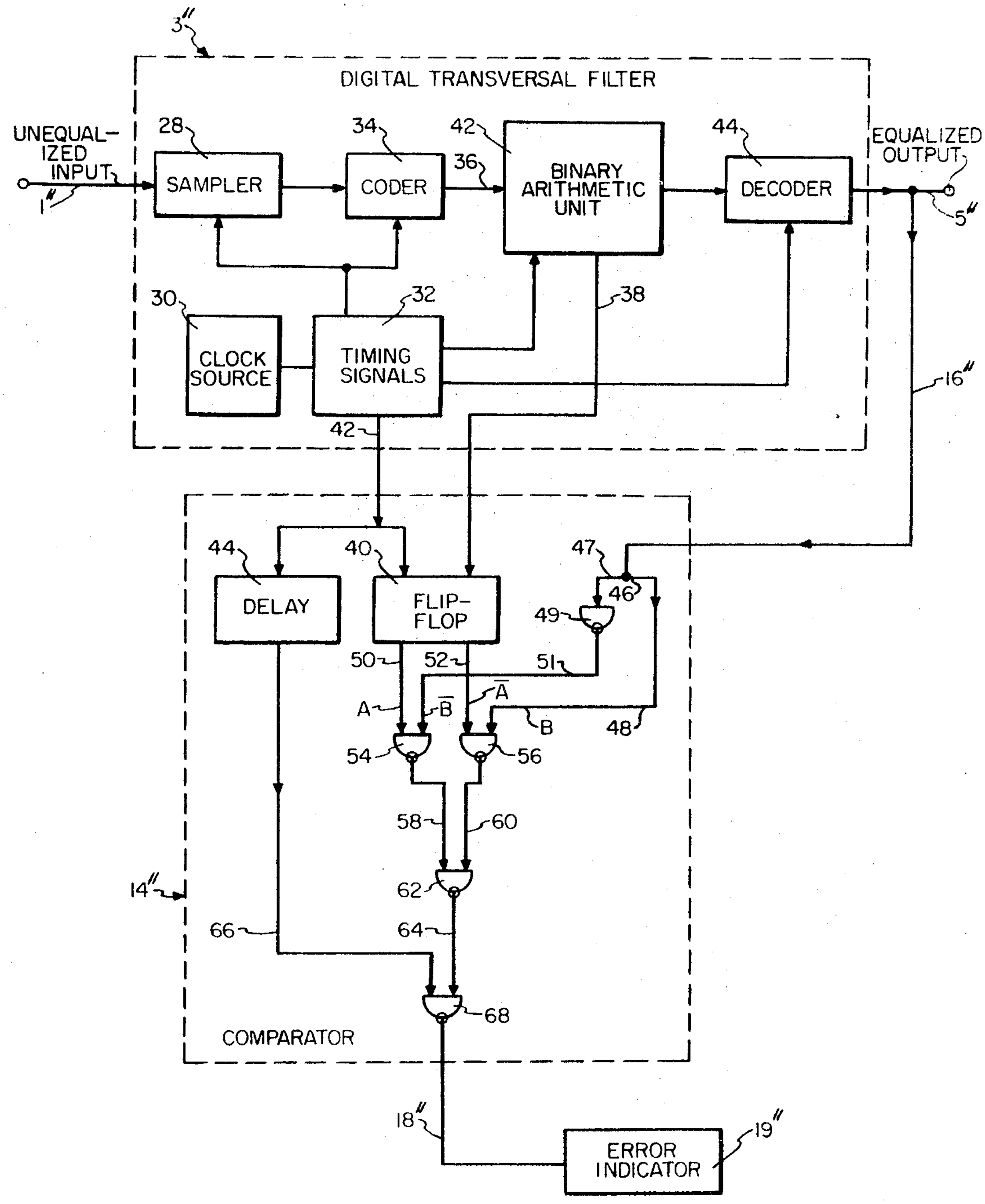
FIG. 3 is a block diagram of an error detection system according to the invention in which a digital filter is used in the equalization process.

A third embodiment of the invention is shown in FIG. 3. In this case the transversal filter is of the digital type. Transversal filters can be either analog or digital and a digital adaptive equalizer is described in U.S. Pat. application, Ser. No. 24,791 of A. Lender and H. H. P. Olszanski, filed Apr. 1, 1970, and entitled "A Digital Adaptive Equalizer System." In this digital adaptive equalizer, the incoming unequalized data signal is converted into PAM samples in sampler 28, the PAM samples are then quantized to obtain binary representations of the signal amplitudes and the quantized signal samples are digitally processed in a binary arithmetic unit such as shown in block form in 42. Such a binary arithmetic unit can take a number of forms. In the referenced patent application the quantized signals are applied via multiplexing gates to shift registers one for each digit of the quantized sample. The number of stages in the shift registers correspond to the number of taps in a delay line of a transversal filter employing a tapped delay line. Further, the combination of the sampling, quantizing, multiplexing and shift register storage steps provides an equivalence to the tapped delay line of the conventional analog filter. The output of the main tap of the tapped delay line of FIG. 2 is a delayed replica of the unequalized data signal. To obtain the equivalence in the digital filter the most significant magnitude digit is taken from the quantized signal. As will be shown later, there is a polarity digit which is the most significant digit as well as a second digit which is the most significant magnitude digit. In the technique of the invention the quantized signals are converted to signed magnitude form to simplify the arithmetic processing and thus obtain the desired phase equalization. In the signed magnitude form, the quantized unequalized signal provides the desired unequalized binary output which is required as one input to the comparator where a modified duobinary signal is employed for data transmission. As with FIG. 2, those items performing a similar function as those illustrated in FIG. 1 are given the same base number, but in this case a double prime is used with the number in order to distinguish it from those given in either FIG. 1 or FIG. 2. For clarity, a specific example will be used in the following description. The input signal in question will be assumed to be modified duobinary with three amplitude levels. The center level is interpreted as binary "1" and the top and bottom levels as binary "0." This signal is described in detail in Lender U.S. Pat. No. 3,457,510 issued July 22, 1969. Other types of signals can be equally well used in this digital equalizer. A modified duobinary waveform with three levels is used only for illustrative purposes. The unequalized input signal appears on input lead 1″ and is applied to the sampler 28 of digital transversal filter 3″. The sampler samples the input signal at the digit rate to provide a PAM output which is applied to coder 34. In coder 34 the PAM sample is quantized to provide an *n*-digit output signal for processing in the binary arithmetic unit 42 prior to decoding in decoder 44. The quantized output from coder 34 appears in binary form having N parallel binary digits. Each group of these parallel digits represent one PAM sample. Such a sequence of digits in binary form is shown in Table I. The binary form is converted into signed magnitude form to facilitate arithmetic operations in binary arithmetic unit 42 in FIG. 3. The signed magnitude form corresponding to binary form is also shown in Table I. The first digit (or most significant) designated $X_0$ indicates the polarity of the signal sample and all other digits represent magnitude. The second digit designated $X_1$ is the most significant binary magnitude digit of the signal sample. The quantized output from coder 34 is applied to the binary arithmetic unit 42, where the quantized signals are first stored in shift registers and then converted to signed magnitude form prior to processing. The most significant magnitude digit, $X_1$, provides a delay binary equivalent of the unequalized input signal and this digit output is made available to comparator 14″ via lead 38. It would be possible to take the unequalized input of 1″ and delay and process it to obtain the unequalized binary equivalent of the incoming signal. This would, however, increase the circuit complexity and, hence, costs. It would also be possible to take the binary signal at junction 36 immediately following the quantizing step. However, time delay and additional processing would be necessary for the proper timing and interpretation of the signal samples. By taking the unequalized most significant digit from the output of the binary to signed magnitude converter this unequalized equivalent signal experiences the same delay as the equalized signal at the output 5″ of filter 3″ as shown in FIG. 3. Consequently it is not necessary to introduce additional delay for an unequalized output at 36 to line it up in time with the equalized output 5″. In Table I the first digit, $X_0$, in the signed magnitude form indicates polarity, positive or negative. The second digit, $X_1$, is actually the first magnitude digit. This digit, as can be seen from Table I, is sufficient to convert the three-level modified duo-binary signal to binary form. When $X_1 = 0$, the binary output is "1" (center level) and when $X_1 = 1$, the binary output is "0" (extreme levels). Hence this signal digit, $X_1$, is applied from the main tap through junction 38 to one input of comparator 14. This single digit, $X_1$, provides the unequalized modified duobinary signal in a binary form. Other types of signals may be treated in a similar manner.

TABLE I.—QUANTIZED SIGNAL REPRESENTATION

| Binary | | | | Signed magnitude | | | | |
|---|---|---|---|---|---|---|---|---|
| | | | | X0 | X1 | X2 | X3 | |
| 1 | 1 | 1 | 1 | 0 | 1 | 1 | 1 | Binary "0". |
| 1 | 1 | 1 | 0 | 0 | 1 | 1 | 0 | |
| 1 | 1 | 0 | 1 | 0 | 1 | 0 | 1 | |
| 1 | 1 | 0 | 0 | 0 | 1 | 0 | 0 | |
| | | | | | | | | Slicing level. |
| 1 | 0 | 1 | 1 | 0 | 0 | 1 | 1 | Binary "1". |
| 1 | 0 | 1 | 0 | 0 | 0 | 1 | 0 | |
| 1 | 0 | 0 | 1 | 0 | 0 | 0 | 1 | |
| 1 | 0 | 0 | 0 | 0 | 0 | 0 | 0 | |
| 0 | 1 | 1 | 1 | 1 | 0 | 0 | 0 | |
| 0 | 1 | 1 | 0 | 1 | 0 | 0 | 1 | |
| 0 | 1 | 0 | 1 | 1 | 0 | 1 | 0 | |
| 0 | 1 | 0 | 0 | 1 | 0 | 1 | 1 | |
| | | | | | | | | Slicing level. |
| 0 | 0 | 1 | 1 | 1 | 1 | 0 | 0 | Binary "0". |
| 0 | 0 | 1 | 0 | 1 | 1 | 0 | 1 | |
| 0 | 0 | 0 | 1 | 1 | 1 | 1 | 0 | |
| 0 | 0 | 0 | 0 | 1 | 1 | 1 | 1 | |

A second input to the comparator 14″ is taken from the equalized output, also in binary form after decoding, on 5″ via lead 16″ to the comparator 14″. Timing signals are applied via lead 42 to comparator 14″ in order to provide the proper clock timing for comparison of the digit signals. The unequalized binary signal is thus applied via lead 38 to the set-reset input of the flip-flop 40. Flip-flop 40 provides outputs which are inverse (or complement) of each other on leads 50 and 52 which are connected as one input to each of the NAND-gates 54 and 56 respectively. When the unequalized binary input to the flip-flop 40 is a 1 then the output on lead 52 is also a 1, and the output on lead 50 is the complement or a 0. This is the upright condition for the complementary outputs of flip-flops 40. The equalized output from lead 16″ to comparator 14″ is divided at junction 46 into two inputs on leads 47 and 48. From junction 46 the equalized output is applied to inverter 49 via lead 47 and then is applied as one input to NAND-gate 54 via lead 51. NAND-gates 54, 56 and 62 form an EXclusive-OR gate. The property of EXclusive-OR gate is such that when the two inputs are identical the output is "0" (no output), otherwise it is "1," indicating an error. Let us denote the unequalized waveform input on lead 50 in FIG 3 as A. Then its inverse on lead 52 is $\bar{A}$. Similarly, let the equalized waveform input be B on lead 48. Then the output of inverter 49, or input to 54 on lead 51 is $\bar{B}$. The logic is illustrated using the letters A and B as hereinabove described. The EXclusive-OR output is $A\bar{B}+\bar{A}B$ where the input is as illustrated in FIG. 3. The actual logic expression is:

$$\overline{[(A\bar{B})(\bar{A}B)]}=A\bar{B}+\bar{A}B$$

The detailed description of operation of the logic in accordance with the invention is as follows. Referring again to FIG. 3, when the equalized and unequalized inputs are the same, for example both are 1's, then the inputs to NAND-gates 54 and 56 are as follows:

NAND-gate 54 has a 0 input applied via lead 50 and a 0 input applied from the output of inverter 49 which is 0 and thus NAND-gate 54 provides a 1 output on lead 58. At the same time the input to NAND-gate 56 from flip-flop 40 via lead 52 is a 1 and the input from lead 48 is also a 1 and therefore NAND-gate 56 has an output 0. This is applied via lead 60 to the other input of NAND-gate 62. NAND-gate 62 thus has 1 0 inputs which causes a 1 output to appear on lead 64 which is applied then to NAND-gate 68. A timing signal from 32 is applied via lead 42 to delay 44. Delay 44 is needed to compensate for delay in flip-flop 40 and the gates. As a result, the timing signal input to NAND-gate 68 appears as a 1 and thus NAND-gate 68 has 1 1 inputs. This causes a 0 output to appear at the output of the comparator on lead 18″ which is applied then to the error indicator 19″. Since there is no output in this case, no error indication occurs. When the binary unequalized and equalized inputs to comparator 14″ are not the same, for example, when the unequalized binary input to flip-flop 40 is a 1 and the equalized input via lead 16″ is a 0 then the following occurs. Inverter 49 changes the equalized input to NAND-gate 54 to 1 and the unequalized input via lead 50 is a 0 thus a 1 output appears on lead 58. At the same time there is 1 0 inputs to NAND-gate 56 which causes a 1 output to appear on lead 60. Thus NAND-gate 62 has 1 1 inputs and this causes gate 62 to provide a 0 output on lead 64. The timing signal 66 again appears as a 1 input to NAND-gate 68 but now the input via lead 64 is a 0 and the 1 0 inputs cause a 1 to appear on the output of the comparator output lead 18″ and thus an error is indicated by means of error indicator 19″. Thus when the equalized output and the unequalized input are not the same it is apparent that an error indication will occur, and the bit-by-bit error rate prior to equalization is achieved both for the initial circuit condition and on a continuing basis.

What is claimed is:

1. In a data transmission system having a data transmitter, a data receiver and a transmission medium connected therebetween, apparatus for detecting errors in an unequalized data signal received at the receiver comprising:

a transversal filter in said data receiver having an input for accepting the unequalized data signal, an output, and means for converting said unequalized input data signal into an equalized binary data signal which is applied to said output;

first circuit means having an output and an input which is operatively connected to said transversal filter, said first circuit means providing an equalized data signal at said output;

second circuit means having an output and an input which is operatively connected to said transversal filter, said second circuit means providing an unequalized data signal at said output;

a comparator having an output and a plurality of inputs, a first said input being operatively connected to the output of the first circuit means and a second said input being operatively connected to the output of said second circuit means and means for generating an error signal at said output when a comparison of the inputs from said first and second circuit means indicates that an error has occurred; and error indicating means connected to the output of said comparator to provide, in response to said error signal, an indication of the transmission errors in the input data signal.

2. Error detecting apparatus in a data receiver as claimed in claim 1, wherein said first circuit means is connected at the output of said transversal filter, and said second circuit means is connected to the input of said transversal filter, said second circuit means including time delay means for providing a time delay of substantially the same duration as that caused by the passage of the unequalized data signal through the transversal filter.

3. Error detecting apparatus as claimed in claim 2, wherein said second circuit means includes means for changing the unequalized data signal into a binary representation of said signal.

4. Error detecting apparatus as claimed in claim 1, wherein said transversal filter includes a tapped delay line with a plurality of taps including a main tap, said first circuit means being operatively connected to the output of said transversal filter and said second circuit means being operatively connected to said main tap.

5. Error detecting apparatus as claimed in claim 1, wherein said transversal filter comprises means for converting said unequalized data signal into an *n*-digit binary code having a most significant digit determinative of the binary representation of said unequalized data signal, and wherein said second circuit means is connected to said converting means.

6. Error detecting apparatus as claimed in claim 1, wherein said transversal filter comprises sampling means for changing said unequalized data signal into pulse amplitude modulation samples, quantizing means connected to said sampling means for changing said pulse amplitude modulation samples into *n*-digit binary signals having a most significant digit, binary arithmetic means connected to said quantizing means for providing an equalized *n*-digit output and a binary output representative of said unequalized data signal, decoding means for changing said unequalized *n*-digit output into an equalized binary data signal, and clock means to provide timing signals to the quantizing, arithmetic and decoding means; and wherein the input of said second circuit means is connected to said binary output representative of said unequalized data signal.

7. Error detecting apparatus as claimed in claim 4, wherein said comparator comprises an EXclusive-OR gate.

8. Error detecting apparatus as claimed in claim 5, wherein said first circuit means is connected to the output of said transversal filter.

9. Error detecting apparatus as claimed in claim 6 wherein said comparator further comprises:

a timing means;

a first logic means having an input operatively connected to the transversal filter to select from said filter a binary signal representative of said equalized data signal, said first logic means having first and second outputs which provide at said outputs complementary binary signals in response to the equalized data signal applied to the input the order of the complementary signals being upright when the input is 1 and in inverted order when the input is 0:

a memory means having a first input operatively connected to said timing means and a second input operatively connected to the transversal filter to select from said filter a binary signal representative of said unequalized data signal, said first logic means having first and second outputs which provide at said outputs complementary binary signals at the timing rate in response to the unequalized data signal at the second input, the order of the complementary signals at said outputs being upright, i.e., first output is 0 and second output is 1 when the unequalized data signal input is 1, and inverted, i.e., 1 and 0, respectively, when the unequalized data signal is 0;

a second logic means having a plurality of inputs, and an output, one each of said inputs being operatively connected to an output of said first logic and said memory means, said second logic means providing an output of one binary state when the complementary states of the first logic means and the memory means are alike, i.e., both are either upright or inverted, and providing an output of the other binary state when the complementary states of the logic means and memory means are unlike, i.e., one is upright and the other is inverted;

delay means having an input connected to said timing means, an output, said delay means providing a time delay to the timing means output of the same magnitude as that experienced by the unequalized signal in passing through said memory means and said second logic means;

a gating means having a first input connected to the output of said delay means, a second input connected to the output of said second logic means, and an output, said gating means providing an output of one binary state when the input from the second logic means is of one binary condition and an output of a second binary state when the input from the second logic means is in the other binary condition.

* * * * *